United States Patent [19]

Ezis

[11] 4,268,466  
[45] May 19, 1981

[54] METHOD OF FORMING A SLIP CAST ARTICLE OF CELLULAR CONSTRUCTION

[75] Inventor: Andre Ezis, Grosse Ile, Mich.

[73] Assignee: Ford Motor Company, Dearborn, Mich.

[21] Appl. No.: 781,376

[22] Filed: Mar. 25, 1977

[51] Int. Cl.³ .............................................. C04B 35/58
[52] U.S. Cl. ....................................... 264/42; 264/51; 264/86
[58] Field of Search ....................... 264/42, 45.6, 45.7, 264/86, 51

[56] References Cited

FOREIGN PATENT DOCUMENTS 779474 7/1957 United Kingdom ................... 264/86

OTHER PUBLICATIONS

Ezis, *Ceramics for High Performance Applications,* pp. 207–222, 1974.

*Primary Examiner*—John Parrish
*Attorney, Agent, or Firm*—William E. Johnson; Olin B. Johnson

[57] ABSTRACT

A method of forming a slip cast article having at least one zone of cellular construction is disclosed. The method may be utilized to make articles having zones of different cellular size as well as articles having zones of cellular construction adjacent zones of noncellular construction. In its simplest form, the method is carried out by providing a slip casting mold which has a casting volume formed therein. A stabilized casting slip is poured into the casting volume. The pH of the stabilized casting slip is increased until a hydrolysis reaction takes place between the water forming the vehicle and an oxidizable metal forming the casting material. This hydrolysis reaction results in the evolution of gases, some of which are trapped within the slip to develop a zone of cellular construction. The greater the increase in pH, the more vigorous is the hydrolysis reaction and the resulting cellular construction has larger sized cells. The hydrolysis reaction may be terminated to produce a zone of noncellular construction.

12 Claims, 8 Drawing Figures

U.S. Patent     May 19, 1981     4,268,466
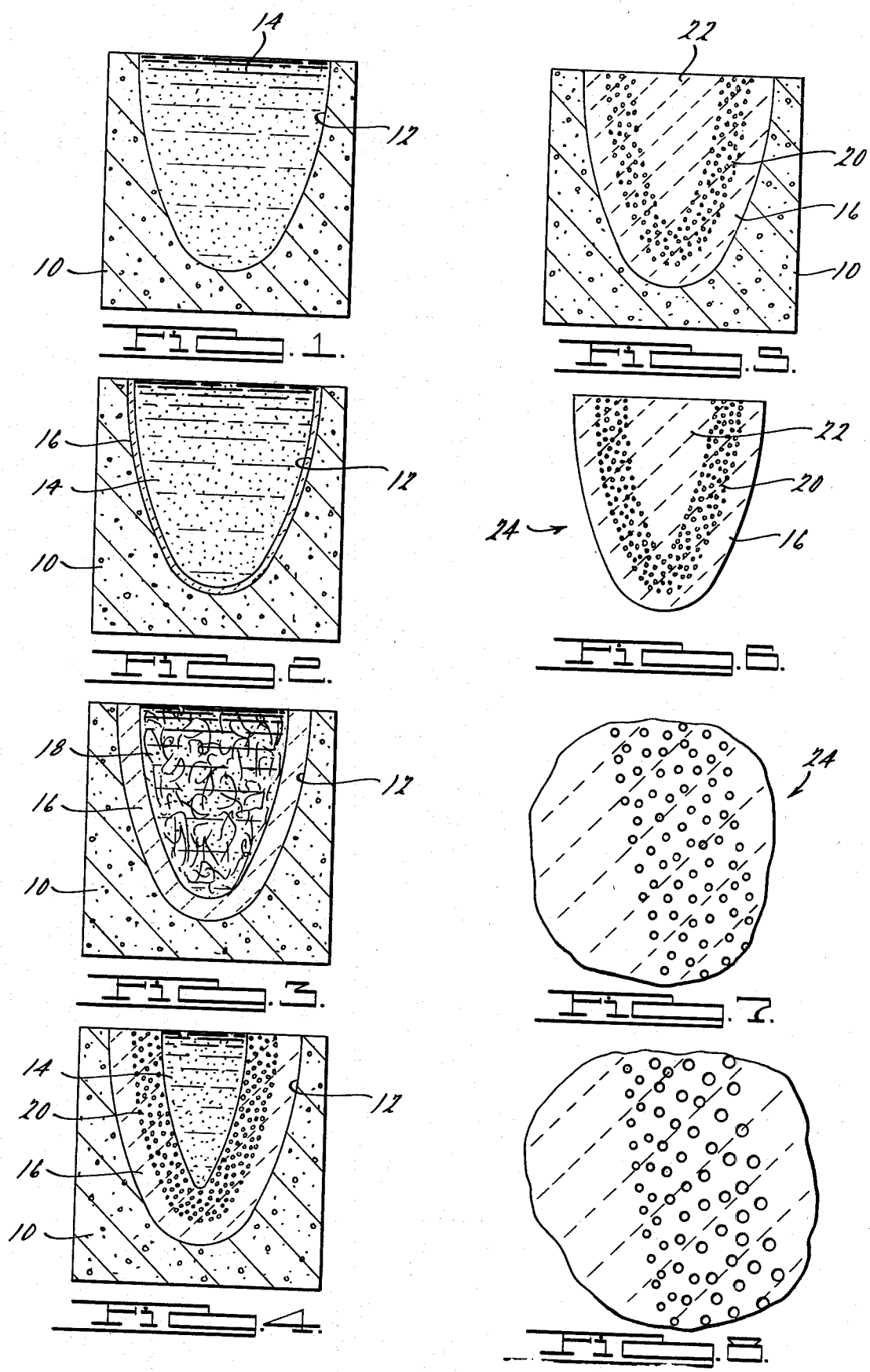

METHOD OF FORMING A SLIP CAST ARTICLE OF CELLULAR CONSTRUCTION

The invention herein described was made in the course of or under a contract or subcontract thereunder with the Department of Army. (DAAG-46-71-C$_7$0162).

BACKGROUND OF THE INVENTION

In forming slip cast articles, I have long worked with stabilized silicon slips where water is a vehicle for forming the slip. The stabilized slips generally have a pH in the range from 6.5 to 7.9 and exhibit a minimum viscosity and result in the production of a slip cast article having the maximum density. The making and using of such silicon slips are disclosed more thoroughly in U.S. patent application Ser. No. 415,898 filed Nov. 14, 1973, now abandoned, and assigned to the same assignee as this application. This prior application is hereby incorporated by reference. The use of such slips in slip casting operations results in the production of a final article which is of uniform density throughout its entire extent.

I have been endeavoring to develop articles which would have zones of cellular construction, such zones being connected in a homogeneous and uniform manner to a zone of different cellular density or of noncellular construction. Such an article, for example, would be of value in forming a bullet-like structure which forms a portion of a flow path for a gas turbine engine in which all of the principal elements are formed from ceramic material. This bullet-like structure would have an outer skin of noncellular construction of high and uniform density connected directly to a cellular zone of low density which would provide strength and rigidity for the outer skin.

I have now developed a method by which slip cast articles can be made from slips containing water as the slip vehicle and an oxidizable metal as a casting material, these articles having at least one zone of cellular construction therein. My method permits the manufacture of articles having zones of different cellular density, articles which have gradual but changing zones of different cellular density, and articles having intermixed zones of cellular and noncellular construction.

SUMMARY OF THE INVENTION

This invention is directed to a method of forming a slip cast article, and more particularly, to a method of forming a slip cast article having at least one zone of cellular construction.

In accordance with the general teachings of this invention, a method of forming a slip cast article having at least one zone of cellular construction is carried out as follows. A slip casting mold is provided which has both a casting volume formed therein in the configuration of the article to be formed and a capability of withdrawing a vehicle from a casting slip poured into the casting volume. A stabilized casting slip including water as the vehicle of the slip and an oxidizable metal as the casting material of the slip is poured into the casting volume of the casting mold. The casting mold acts on the stabilized casting slip to withdraw the vehicle from the stabilized casting slip. The pH of the stabilized casting slip held within the casting volume is increased until a hydrolysis reaction takes place between the vehicle and the casting material of the slip resulting in the evolution of gases. Portions of the gases evolved are trapped within the slip to develop a zone of cellular construction formed of the casting material. Continued contact is permitted between the casting slip and the casting volume so that the vehicle of the casting slip is withdrawn into the casting mold. After the vehicle has been withdrawn, an article of casting material is produced which is removable from the casting volume. This article is removed from the volume in order to produce a finished slip cast article having at least one zone of cellular construction.

The pH of the stabilized casting slip may be increased immediately after the stabilized slip has been poured into the casting volume. This action produces an article which has a zone of cellular construction formed from the articles outer surface into the interior thereof.

On the other hand, the pH of the stabilized casting slip may not be increased until after a portion of the vehicle has been withdrawn from the casting volume by the slip casting mold. In this manner, the final article produced has a first zone of substantially continuous casting material at its outer surface and a second zone of cellular construction thereafter.

One important advantage to the method of my invention is that there is a smooth and even transformation of casting material between cellular and noncellular zones. This results in a finished article which has no interfacial layers which could cause trouble in subsequent use of the article.

The basic method of my invention may be utilized in several different manners. For example, the pH of the stabilizing slip may be increased in a continuous or stepwise fashion. If the pH is increased in a continuous fashion, the zone of cellular construction will have cells that increase in size as one goes away from the face of the mold to which the vehicle was drawn. This results because at the higher pH's the evolution of gases from the hydrolysis reaction is more vigorous. If the pH was increased in a stepwise fashion, there would be a new zone of cellular construction for each pH and the cells would be larger for the higher pH's.

The method of this invention may also be utilized to produce articles having a zone of cellular construction sandwiched between two zones of noncellular construction. This processing is accomplished by first permitting the portion of the vehicle to be withdrawn from the slip prior to increasing the pH, thereafter increasing the pH to produce the zone of cellular construction, and finally, decreasing the pH of the slip back to that pH which produces a noncellular zone.

The type of structures that may be produced and the different forms of cellular and noncellular zone location is infinite. One must simply go from a pH which produces hydrolysis in the slip to a pH which does not produce hydrolysis in order to go from a cellular zone to a noncellular zone. Also, the magnitude of the pH acts as an another control on the size of the cells for the cellular zone.

BRIEF DESCRIPTION OF THE DRAWINGS

FIGS. 1 through 5 are graphical illustrations of the steps which form a preferred embodiment of the method of my invention.

FIG. 6 is a graphical presentation of a portion of the article produced by steps illustrated in FIGS. 1 through 5.

FIGS. 7 and 8 are magnified graphical presentations of what an article produced by the method of my invention would look like.

DESCRIPTION OF THE PREFERRED EMBODIMENT

An application of the method of this invention to form an article having at least a zone of cellular construction is illustrated in graphical form in FIGS. 1 through 5. In FIG. 1, a slip casting mold 10 is shown. This mold has a casting volume 12 formed therein. In this preferred form, the casting volume has a nose cone shape. The slip casting mold can be made of any material which is capable of withdrawing a vehicle of a slip from the casting volume. In most cases, the mold is made from a material such as plaster of paris.

As shown in FIG. 1, the casting volume 12 of the slip casting mold 10 contains a fresh casting slip 14 which has just been poured therein. In the preferred form, the casting slip is made up of water as the slip vehicle and silicon particles as the casting material supported therein. The method of this invention is applicable to any casting slip wherein water is the vehicle and the material supported therein is an oxidizable metal.

For this preferred embodiment, the casting slip 14 is prepared in the following manner. Silicon of about 98.5 percent purity and a nominal size of 325 mesh is comminuted by dry milling in a 4.5 gallon porcelain mill with high density aluminum balls for 17 hours at an rpm of 34. Upon completion of this milling operation, the silicon powder has a mean particle size of 5.5 microns. After seven days of shelf aging, the 5.5 micron silicon is formulated into a chemically suspended slip by using distilled water as the vehicle and an alkaline organic as a deflocculant. This slip composition is as follows: 75.00 weight percent of 5.5 micron silicon powder, 24.98 weight percent of distilled water and 0.02 weight percent of monoethanalamine. After preparation, the slip is homogenized and allowed to obtain chemical equilibrium by rolling the slip at an rpm of 42 in a five gallon nalgene container for periods of up to ten days. The resultant stabilized slip has a viscosity of 125 centipoise, a pH of 6.0 and a specific gravity of 1.73. By adding a small amount of ammonia hydroxide, a viscosity minimum of 90 centipoise is reached at a pH of 7.5. Upon casting, this slip yields a green density of about 1.70 grams per cc of the silicon article. Upon subsequent nitriding of this silicon article, the silicon nitride density will be about 2.75 grams per cc. These densities are achieved in the zones of noncellular construction.

FIG. 2 illustrates the formation of a first zone of an article to be formed by the preferred method of this invention. This zone is formed because the slip casting mold withdraws the vehicle from the slip contained in the casting volume 12 as is well known in the art, the drawing of the vehicle out of the casting volume and into the slip casting mold results in the deposition of the slip casting material along the mold surfaces through which the vehicle is withdrawn and thereafter a gradual buildup of a first zone 16. Additional casting slip 14 may be added to the mold during the casting operation to replace the materials being withdrawn and that being deposited to form the first zone.

Turning now to FIG. 3, the slip can be made to gas or to foam by altering the chemical environment of the slip by additions of strong basic solutions such as triethanalamine, monoethanalamine, sodium hydroxide, or ammonia hydroxide, for example. The increase in pH initiates a hydrolysis reaction between the silicon and the water which results in the formation of gases such as hydrogen and silicon hydride. The intensity of the reaction or the amount of gas evolved can be controlled by selecting a specific pH. The higher the pH, the more vigorous the reaction. In accordance with the teachings with this invention, the first zone has a thickness of approximately 0.060 inches and it is formed by allowing the mentioned casting slip to stand for five minutes. After the five minutes, monoethanalamine was added to increase the pH of the slip to above ten. At this point, the hydrolysis is initiated and considerable gasing begins, this being indicated in FIG. 3 by the numeral 18.

After a period of ten minutes, sufficient acidic material is added to the slip 14 remaining in the casting volume 12 in order to return the pH to 7.5. This, once again, produces aquiescent casting slip 14. If necessary, additional casting slip may be added to the casting volume to keep it filled. The result of the gasing, however, has produced a second zone 20 of cellular construction. This is illustrated in FIG. 4.

The slip casting operation is continued now until a third zone 22 of noncellular construction is developed. This third zone is illustrated in FIG. 5. When substantially all of the slip vehicle has been withdrawn by the slip casting mold 10, the completed article generally identified by the numeral 24 can be removed from the mold. This is illustrated in FIG. 6. The thus completed article 24 has two noncellular zones separated by a cellular zone.

The resulting silicon article 24 may be nitrided by standard nitriding techniques to produce a silicon nitride article. This article would, as is illustrated in FIG. 7, have a uniform transition between the zones without any identifiable interfacial surface area. Thus, the article produced by my method is one in which a uniform transition takes place from one zone to the other, that type of transition providing a greater degree of uniformity than any achieved when trying to bond one surface to another.

It is apparent from the above specification that the method of my invention can be utilized to formulate a great variety of different articles. For example, FIG. 8 illustrates an article which may be produced in which the zone of cellular construction has cells of gradually increasing size. This type of structure can be achieved by continuously changing the pH of the casting slip by, for example, adding one drop at a time of a base. As the hydrolysis reaction becomes more vigorous, the size of the cells increase.

Another alternative way of using the method of my invention is to increase the pH of the casting slip in an incremental fashion with certain periods of time between each increase. This would produce a plurality of zones of cellular construction, each zone having a particular size cell, the size of which is determined by the pH of the casting slip during formation of that zone and the degree of gasing of the slip.

As another alternative, the pH of the slip may be increased to that which produces the gasing reaction immediately upon its placement in the casting volume whereby the first zone of the article to be made will be of a cellular construction.

It is also apparent that any combination of zones can be developed both noncellular and cellular simply by altering the pH of the casting slip at the appropriate times during a slip casting operation.

There has been disclosed herein a method of forming a slip cast article in which the article has at least one zone of cellular construction. After reviewing this specification, those skilled in the art will be able to develop many modifications of this invention which fall within the true spirit and scope thereof. It is intended that all such modifications be included within the scope of the appended claims.

What I claim is:

1. A method of forming a slip cast article having at least one zone of cellular construction which comprises:

providing a slip casting mold having (a) a casting volume formed therein in the configuration of the article to be formed, and (b) a capability of withdrawing a vehicle from a casting slip poured into said casting volume;

providing a stabilized casting slip including water as said vehicle and an oxidizable metal as a casting material;

pouring said stabilized casting slip into said casting volume of said casting mold, said casting mold acting on said stabilized casting slip to slowly withdraw said vehicle from said stabilized casting slip;

increasing the pH of said stabilized casting slip held within said casting volume until a hydrolysis reaction takes place between said vehicle and said casting material resulting in the evolution of gases, portions of said gases evolved being trapped within said slip to develop a zone of cellular construction of said casting material;

permitting continued contact between said casting slip and said casting volume so that said vehicle of said casting slip is withdrawn into said slip casting mold thereby to produce an article of casting material which is removable from said casting volume; and removing said article having a zone of cellular construction from said casting mold.

2. The method of claim 1 wherein: the pH of the stabilized casting slip is increased immediately after said stabilized casting slip has been poured into said casting volume whereby said article produced by the method has a zone of cellular construction formed from said article's outer surface into the interior thereof.

3. The method of claim 1 wherein: the pH of said stabilized casting slip is not increased until after a portion of said vehicle has been withdrawn from said casting volume by said slip casting mold whereby said article produced by the method has a first zone of substantially continuous casting material and a second zone of cellular construction.

4. The method of claim 1 wherein: the pH of the stabilizing casting slip is increased in a continuous manner whereby the resulting article has a zone of cellular construction, the cells of which vary in size from a small size produced at the lowest pH which produces a hydrolysis reaction to a large size at the highest pH.

5. The method of claim 1 wherein: the pH of said stabilizing casting slip is increased in a stepwise fashion whereby the resulting article has a plurality of zones of cellular construction, the zone formed at the lowest pH having the smallest cells and the zone formed at the highest pH having the largest cells.

6. A method of forming a slip cast article having at least one zone of cellular construction which comprises:

providing a slip casting mold having (a) a casting volume formed therein in the configuration of the article to be formed, and (b) a capability of withdrawing a vehicle from a casting slip poured into said casting volume;

providing a stabilized casting slip' including water as said vehicle and an oxidizable metal as a casting material;

pouring said stabilized casting slip into said casting volume of said casting mold, said casting mold acting on said stabilized casting slip to slowly withdraw said vehicle from said stabilized casting slip;

increasing the pH of said stabilized casting slip held within said casting volume until a hydrolysis reaction takes place between said vehicle and said casting material resulting in the evolution of gases, portions of said gases evolved being trapped within said slip to develop a zone of cellular construction;

permitting continued contact between said casting slip and said casting volume so that said vehicle of said casting slip is continued to be withdrawn into said casting mold thereby to develop a zone of cellular construction of said casting material;

decreasing the pH of said casting slip until said hydrolysis reaction no longer takes place between said vehicle and said casting material;

permitting continued contact between said casting slip and said casting volume so that said vehicle of said casting slip is withdrawn into said casting mold thereby to develop a zone of said casting material of noncellular construction and thereby to produce an article of casting material which is removable from said casting volume; and removing said article having a zone of cellular construction from said casting mold.

7. The method of claim 6 wherein: the pH of said stabilized casting slip is increased immediately after said stabilized casting slip has been poured into said casting volume whereby said article produced by the method has a zone of cellular construction formed from said article's outer surface into the interior thereof.

8. The method of claim 6 wherein: the pH of said stabilized casting slip is not increased until after a portion of said vehicle has been withdrawn from said casting volume by said slip casting mold whereby said article produced by the method has a first zone of substantially continuous casting material and a second zone of cellular construction.

9. The method of claim 6 wherein: the pH of the stabilizing casting slip is increased in a continuous manner whereby the resulting article has a zone of cellular construction, the cells of which vary in size from a small size produced at the lowest pH which produces a hydrolysis reaction to a large size at the highest pH.

10. The method of claim 6 wherein: the pH of said stabilizing casting slip is increased in a step-wise fashion whereby the resulting article has a plurality of zones of cellular construction, the zone formed at the lowest pH having the smallest cells and the zone formed at the highest pH having the largest cells.

11. The method of claim 6 wherein: the pH of said stabilizing casting slip is decreased by adding a pH reducing material.

12. The method of claim 6 wherein: the pH of said stabilizing casting slip is decreased by adding sufficient additional stabilized casting slip to make the overall pH of the casting slip present in said casting volume a pH below that at which a hydrolysis reaction will take place.

* * * * *